(12) United States Patent
Frye et al.

(10) Patent No.: US 12,320,385 B2
(45) Date of Patent: Jun. 3, 2025

(54) AXIALLY COMPRESSIBLE BEARING

(71) Applicant: Kohler Co., Kohler, WI (US)

(72) Inventors: Jacob R. Frye, Sheboygan Falls, WI (US); Gabriel M. Niederlander, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/467,475

(22) Filed: Sep. 14, 2023

(65) Prior Publication Data
US 2023/0417281 A1 Dec. 28, 2023

Related U.S. Application Data

(63) Continuation of application No. 17/699,616, filed on Mar. 21, 2022, now Pat. No. 11,795,999, which is a continuation of application No. 16/270,691, filed on Feb. 8, 2019, now Pat. No. 11,280,371.

(51) Int. Cl.
| | |
|---|---|
| *F16C 23/04* | (2006.01) |
| *E03C 1/04* | (2006.01) |
| *F16K 27/00* | (2006.01) |
| *F16L 27/08* | (2006.01) |

(52) U.S. Cl.
CPC ............ *F16C 23/04* (2013.01); *E03C 1/0404* (2013.01); *F16K 27/00* (2013.01); *F16L 27/08* (2013.01); *E03C 2001/0414* (2013.01); *Y10T 137/8807* (2015.04); *Y10T 137/9464* (2015.04)

(58) Field of Classification Search
CPC ................ E03C 1/0401; E03C 1/0416; E03C 2001/0414; Y10T 137/9464

USPC ........................................................ 137/801
See application file for complete search history.

(56) References Cited

U.S. PATENT DOCUMENTS

| | | | |
|---|---|---|---|
| 4,037,264 | A | 7/1977 | Turner et al. |
| 5,381,830 | A | 1/1995 | Niemann et al. |
| 5,458,154 | A | 10/1995 | Niemann |
| 5,464,045 | A | 11/1995 | Niemann |
| 5,934,325 | A | 8/1999 | Brattoli |
| 6,202,686 | B1 | 3/2001 | Pitsch et al. |
| 6,588,453 | B2 | 7/2003 | Marty et al. |
| 6,757,921 | B2 | 7/2004 | Esche |

(Continued)

FOREIGN PATENT DOCUMENTS

| | | |
|---|---|---|
| CN | 1136344 | 11/1996 |
| CN | 2499627 | 7/2002 |

(Continued)

OTHER PUBLICATIONS

Chinese First Office Action On Chinese Patent Application No. 20210082404.5 Dated Apr. 27, 2021 13 Pages.

(Continued)

*Primary Examiner* — Daphne M Barry
(74) *Attorney, Agent, or Firm* — Husch Blackwell LLP

(57) ABSTRACT

Disclosed is a bearing configured to couple a faucet spout to a faucet body. The bearing includes a plurality of fingers extending parallel to a central axis of the bearing. The plurality of fingers is configured to engage with the faucet spout at an intermediate position between a first end of the bearing and a second end of the bearing. The fingers are configured to exert an outward pressure to the faucet spout. The fingers are also configured to compress in a substantially axial direction.

18 Claims, 6 Drawing Sheets

(56) References Cited

U.S. PATENT DOCUMENTS

| | | |
|---|---|---|
| 6,874,527 B2 | 4/2005 | Meeder |
| 7,032,619 B2 | 4/2006 | Gaenzle |
| 8,789,771 B2 | 7/2014 | Esche et al. |
| 8,844,564 B2 | 9/2014 | Jonte et al. |
| 8,899,259 B2 | 12/2014 | Jonte et al. |
| 9,259,744 B2 | 2/2016 | Hansen |
| 9,683,353 B2 | 6/2017 | Myers et al. |
| 10,072,400 B2 | 9/2018 | Bares et al. |
| 2008/0267695 A1 | 10/2008 | Martin |
| 2009/0200794 A1 | 8/2009 | Esche |
| 2014/0174579 A1 | 6/2014 | Wilkerson et al. |
| 2014/0261750 A1 | 9/2014 | Rosko et al. |
| 2015/0013064 A1 | 1/2015 | Marty et al. |
| 2016/0215482 A1* | 7/2016 | Fourman ............... E03C 1/0404 |
| 2018/0195628 A1 | 7/2018 | Tasserit et al. |
| 2019/0003162 A1 | 1/2019 | Fourman et al. |
| 2019/0153707 A1 | 5/2019 | Lu |

FOREIGN PATENT DOCUMENTS

| | | |
|---|---|---|
| CN | 1980712 | 6/2007 |
| CN | 102667195 | 9/2012 |
| CN | 102906479 | 1/2013 |
| CN | 203585632 | 5/2014 |
| CN | 104583617 | 4/2015 |
| CN | 204647634 | 9/2015 |
| CN | 107503403 | 12/2017 |
| CN | 108291679 | 7/2018 |
| DE | 10338542 | 5/2005 |
| GB | 2086513 | 12/1982 |

OTHER PUBLICATIONS

Chinese Second Office Action on CN Appl. Ser. No. 202010082404.5 dated Nov. 9, 2021 (13 pages).

* cited by examiner

AXIALLY COMPRESSIBLE BEARING

CROSS-REFERENCE TO RELATED PATENT APPLICATIONS

The present application is a continuation of U.S. patent application Ser. No. 17/699,616, filed Feb. 8, 2019, now U.S. Pat. No. 11,280,371, which is a continuation of U.S. patent application Ser. No. 16/270,691, filed Feb. 8, 2019, now U.S. Pat. No. 11,280,371, the entire disclosures of which are hereby incorporated by reference herein.

BACKGROUND

The present disclosure relates generally to a bearing used to facilitate assembly of a faucet. More specifically, the present disclosure relates to a bearing used to engage a faucet spout and a faucet body to allow the spout to rotate with respect to the body.

Existing faucet assemblies include bearings (e.g., neck adapters, collars, or guide rings) configured to couple the faucet spout to the faucet body. These bearings include O-rings, bushings, crush ribs, or a combination thereof to engage the faucet spout and the faucet body. The designs of existing bearings require tight tolerances for the spout and the body in order to prevent the spout from wobbling relative to the body, and also to limit the force required to rotate the spout with respect to the body. The overall performance of the faucet assembly depends on the tolerances that can be achieved for the spout and the body. Poor tolerances can result in fitment issues between the spout and the body and, in some cases, can result in excess friction and wear on the mating surfaces of the spout and the body.

SUMMARY

One embodiment of the present disclosure relates to a bearing. The bearing is configured to couple a faucet spout to a faucet body. The bearing includes a plurality of fingers extending along a central axis of the bearing. The plurality of fingers is configured to engage with the faucet spout at an intermediate position between a first end of the bearing and a second end of the bearing. The fingers are configured to exert an outward pressure to the faucet spout. The fingers are configured to compress in a substantially axial direction.

Another embodiment of the present disclosure relates to a bearing. The bearing includes a body including an opening configured to receive a faucet body. The body also includes a plurality of fingers extending along a central axis of the body toward a first end of the body. At least one of the fingers is configured to engage with a faucet spout at an intermediate position between the first end of the body and a second end of the body. The fingers are separated by a plurality of slots extending through the first end of the body.

Another embodiment of the present disclosure relates to a faucet assembly. The faucet assembly includes a faucet body, a faucet spout, and a bearing. The bearing is disposed between the faucet spout and the faucet body. The bearing includes a body defining an opening configured to receive the faucet body. The body includes a plurality of fingers extending along a central axis of the body toward a first end of the body. At least one of the fingers is configured to engage with the faucet spout at an intermediate position between the first end of the body and a second end of the body. The fingers are separated by a plurality of slots extending through the first end of the body.

DETAILED DESCRIPTION

Referring generally to the figures, a faucet assembly includes a bearing that couples a faucet spout to a faucet body. The faucet assembly may be a kitchen faucet mounted behind a sink basin or another faucet type. The bearing is configured to rotatably couple the faucet spout to the faucet body. The bearing include a plurality of fingers configured to engage with the faucet spout along an inner surface of the spout. The spout engages the fingers at an intermediate position (shown by way of example as a substantially "central position") between ends of the bearing. The fingers are curved away from the faucet body and deform to accommodate the spout bore and to secure the spout in position with respect to the faucet body (e.g., to prevent substantially axial movement of the spout relative to the body). The compressible fingers allow a greater tolerance range to be used for the spout and the faucet body, which, advantageously, improves part yield and reduces assembly costs. Moreover, because the fingers are configured to deform (e.g., compress) axially (e.g., to press against opposing ends of a post of the faucet body rather than apply a radial force to the faucet body), friction and wear on the mating bore and shaft are substantially reduced.

According to an exemplary embodiment, the bearing includes crush ribs disposed at a second end of the bearing. The crush ribs also engage with the spout. Together, the fingers and crush ribs prevent wobbling of the spout with respect to the faucet body. These and other advantageously features with become apparent to those reviewing the present disclosure and figures.

Figure 1:
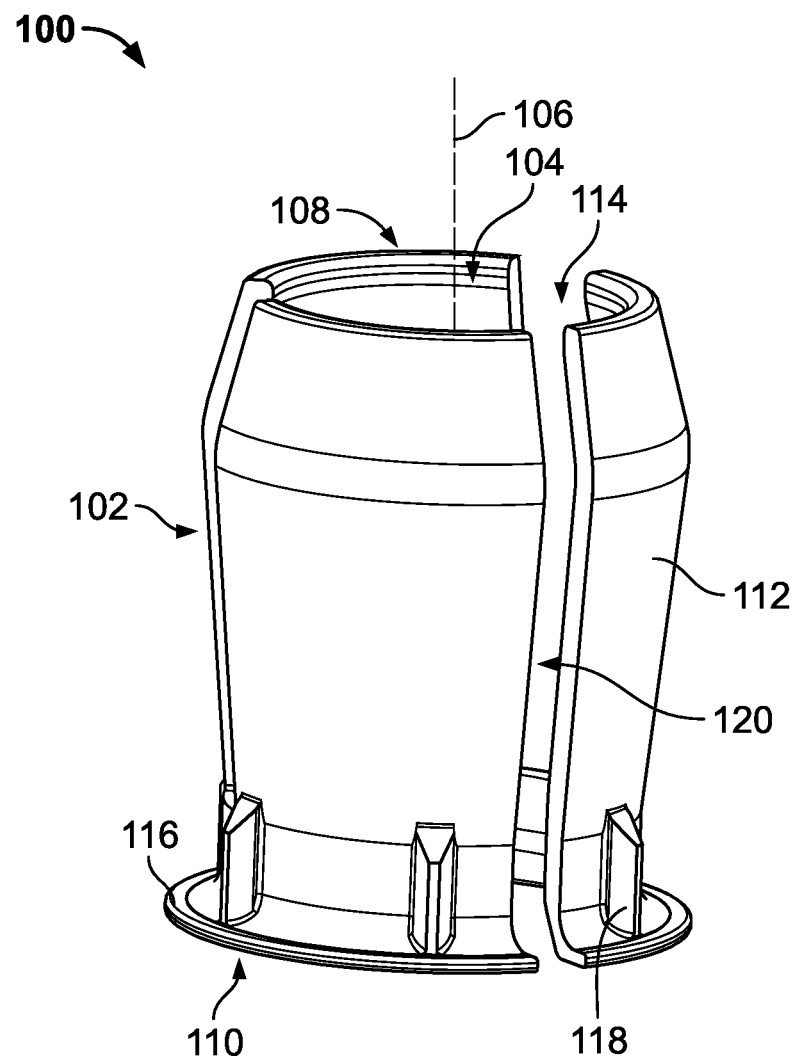
FIG. 1 is a perspective view of a bearing, according to an exemplary embodiment.

Referring to FIG. 1, a bearing 100 is shown, according to an exemplary embodiment. The bearing 100 is configured for use with a faucet assembly. The bearing 100 includes a body 102 defining an opening 104 extending through a central axis 106 of the bearing 100. The body 102 includes a first end 108 and a second end 110 opposite the first end 108. As shown in FIG. 1, the bearing 100 includes a plurality of fingers 112 extending along the central axis 106 toward the first end 108. The fingers 112 are separated by a plurality of slots 114 extending through the first end 108. The bearing 100 additionally includes a flange 116 at the second end 110 and a plurality of ribs 118 (e.g., crush ribs, etc.) extending therefrom.

The bearing 100 may be made from a variety of different materials. According to an exemplary embodiment, the bearing 100 is molded (e.g., injection molded or otherwise formed) from plastic, which allows the bearing 100 to flex and deform in response to an applied force and prevents the bearing 100 from damaging mating surfaces of the faucet assembly when rotated relative to the mating surfaces.

Figure 2:
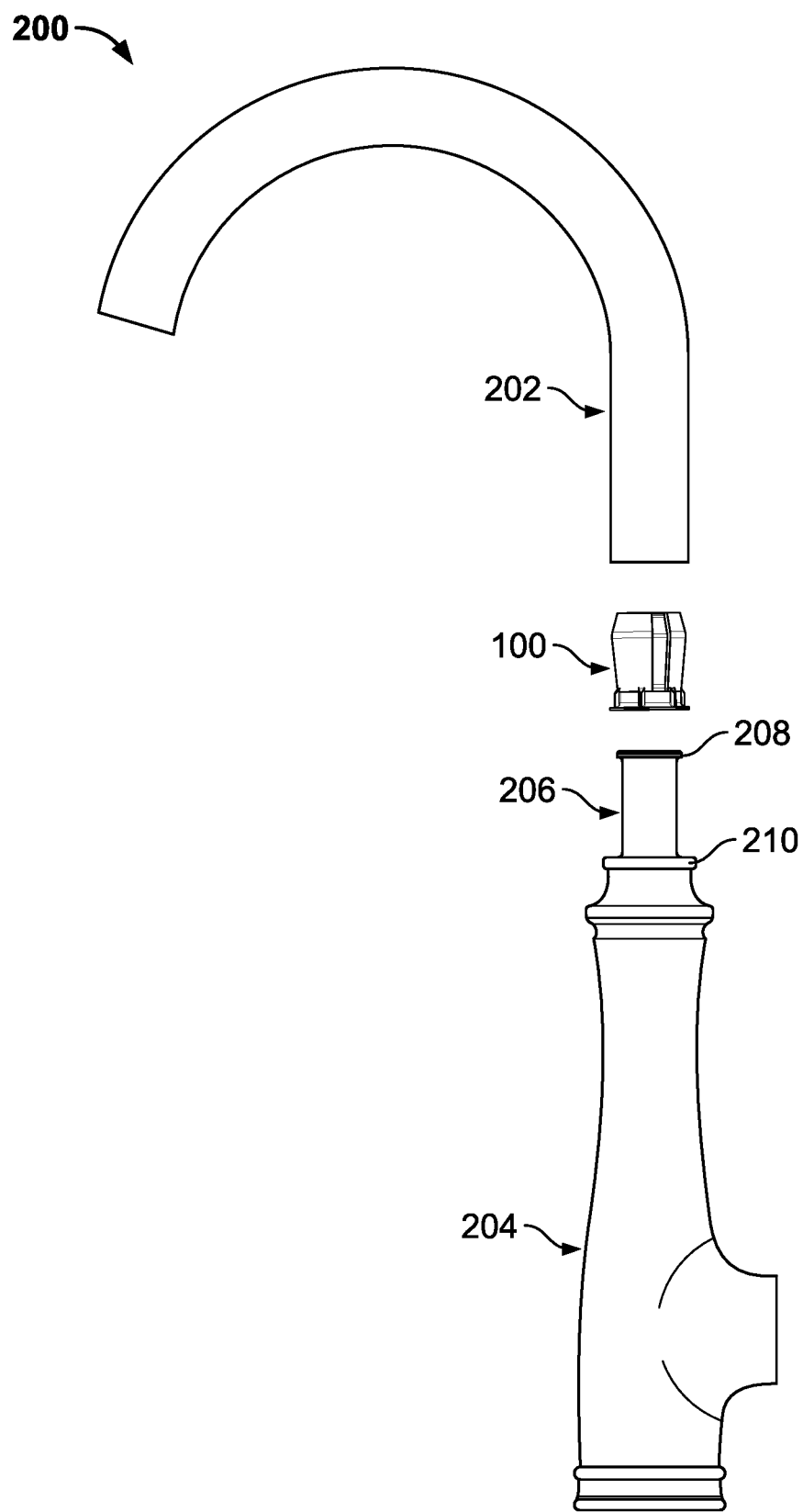
FIG. 2 is an exploded view of a faucet assembly including the bearing of FIG. 1, according to an exemplary embodiment.
Figure 4:
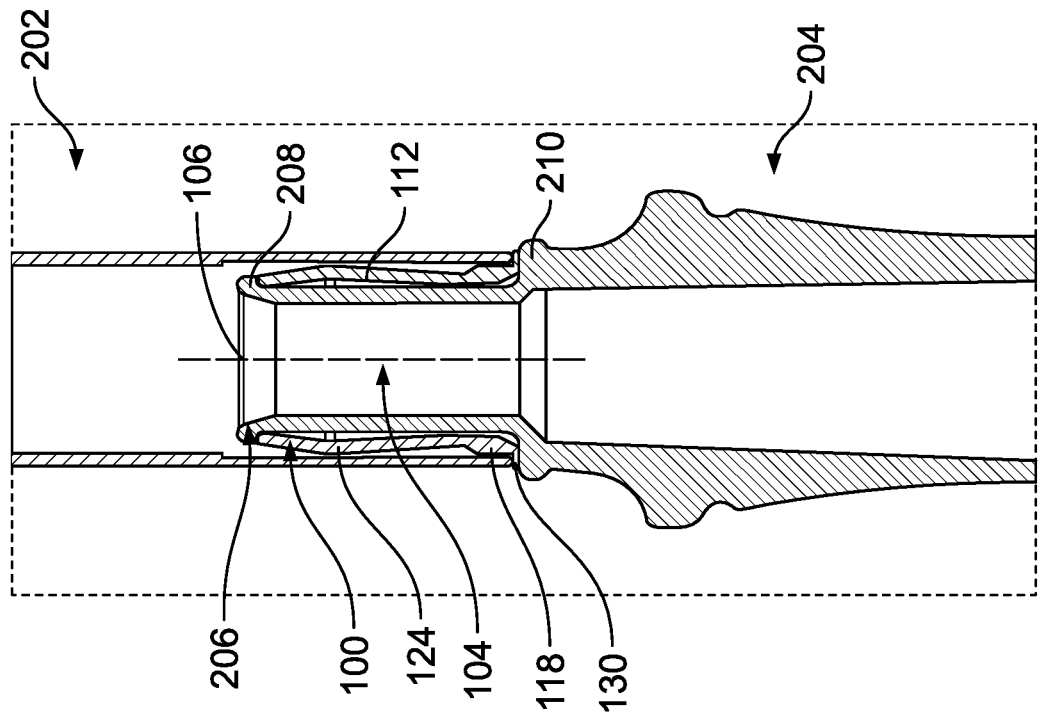
FIG. 4 is a reproduction of FIG. 3 near a bearing of the faucet assembly.
Figure 3:
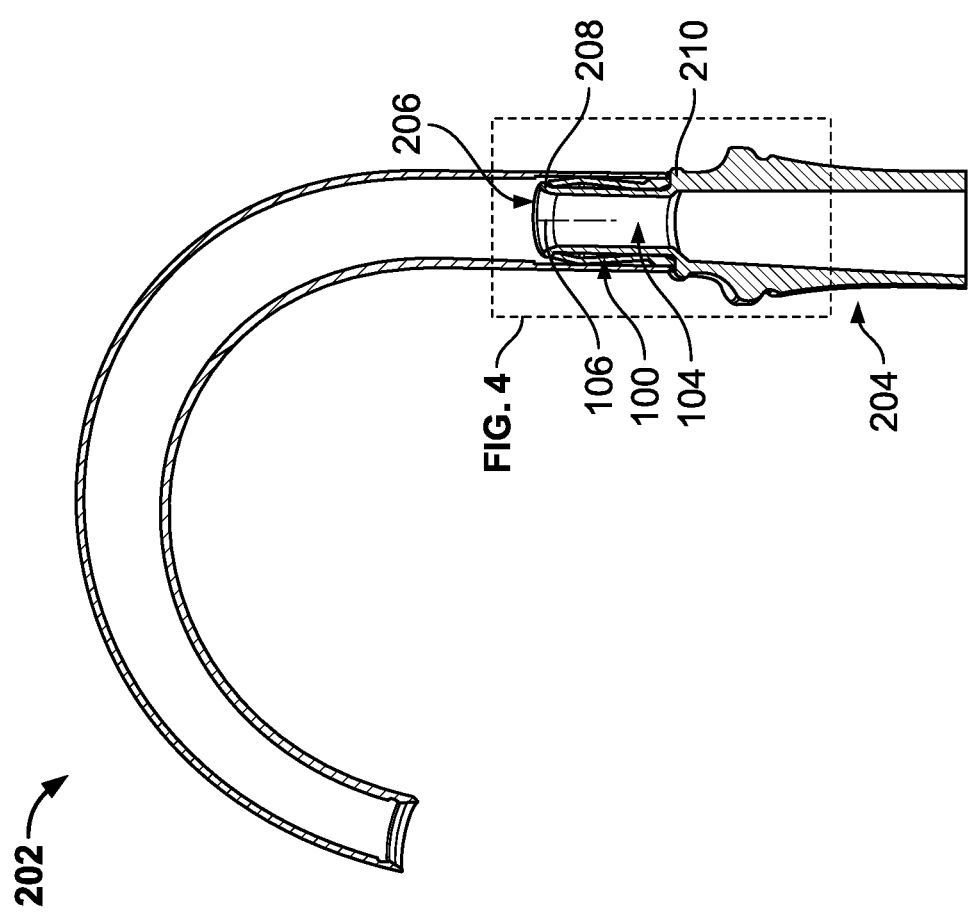
FIG. 3 is a side cross-sectional view of the faucet assembly of FIG. 2, according to an exemplary embodiment.

Referring now to FIGS. 2-4, a faucet assembly 200 is shown, according to an exemplary embodiment. The faucet assembly 200 may be a kitchen faucet, a bathroom faucet, or the like. The faucet assembly 200 is configured to receive water from a water supply conduit (not shown). The water supply conduit may be a water supply line inside a household, a commercial property, or another type of building. The water supply conduit may be configured to supply water at a city water pressure or a well pump pressure. The water supply conduit may be a pipe, tube, or other water delivery mechanism extending from a wall of the building. In some embodiments, the faucet assembly 200 may be mounted on a rear mounting ledge of a kitchen or bathroom sink (e.g., a single or double basin sink, etc.), directly behind a kitchen or bathroom sink, a laundry room sink, or another suitable location. According to an exemplary embodiment, the faucet assembly 200 is configured to swivel (e.g., to rotate along a plane parallel to an opening of a sink basin, etc.) to provide water to different parts of a sink basin.

As shown in FIG. 2, the faucet assembly 200 includes the bearing 100, a faucet spout 202, and a faucet body 204. The faucet body 204 may be configured to couple the faucet assembly 200 to a countertop or a rear ledge of a sink basin. The faucet body 204 may secure the faucet assembly 200 in position relative to the sink basin. As shown in FIG. 2, the faucet body 204 includes a post 206 (e.g., a faucet body post, a faucet body tower, etc.) coaxial with the faucet body 204 and extending upwardly from the faucet body 204. The post 206 includes an upper ledge or lip 208 extending radially outward from the post 206, proximate to an upper end of the post 206. A lower ledge 210 projects radially outward from a lower end of the post 206 and circumferentially surrounds the lower end of the post 206.

The bearing 100 is configured to rotatably couple the spout 202 to the faucet body 204. As shown in FIGS. 3-4, the opening 104 is configured to receive the post 206. As shown in FIG. 1, a first slot 120 of the plurality of slots 114 extends through the first end 108 of the bearing 100 (e.g., through the first end 108 of the body 102 of the bearing 100). To install the bearing 100 (see also FIGS. 2 and 4), the bearing 100 is stretched or otherwise deformed to widen the opening 104. The post 206 is then inserted into the opening 104 through the first slot 120. Once installed onto the post 206, the natural shape of the bearing 100 prevents the bearing 100 from dislodging from the post 206.

Figure 5:
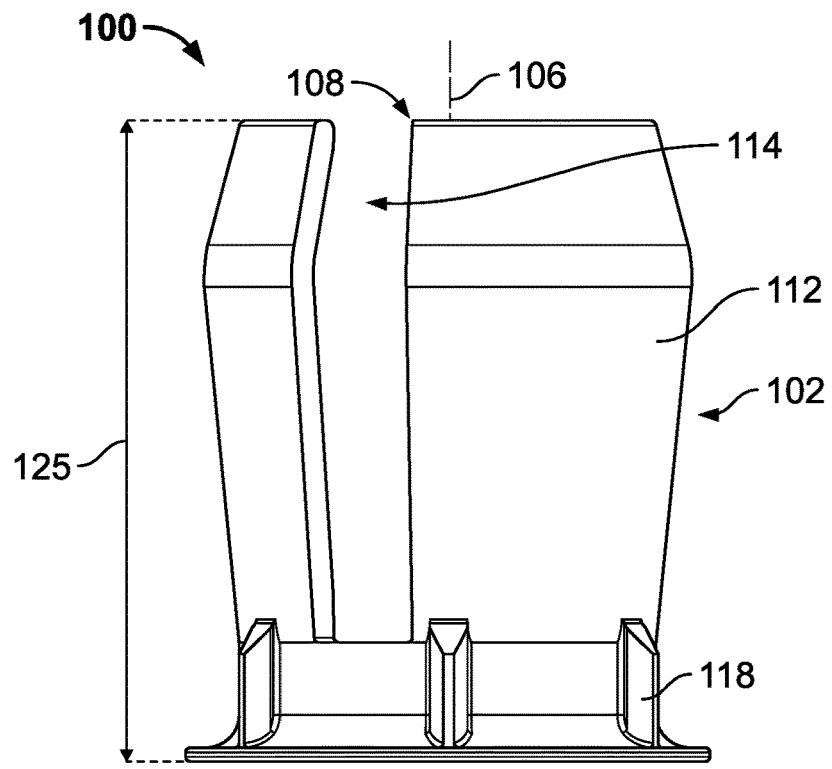
FIG. 5 is a side view of the bearing of FIG. 1.
Figure 6:
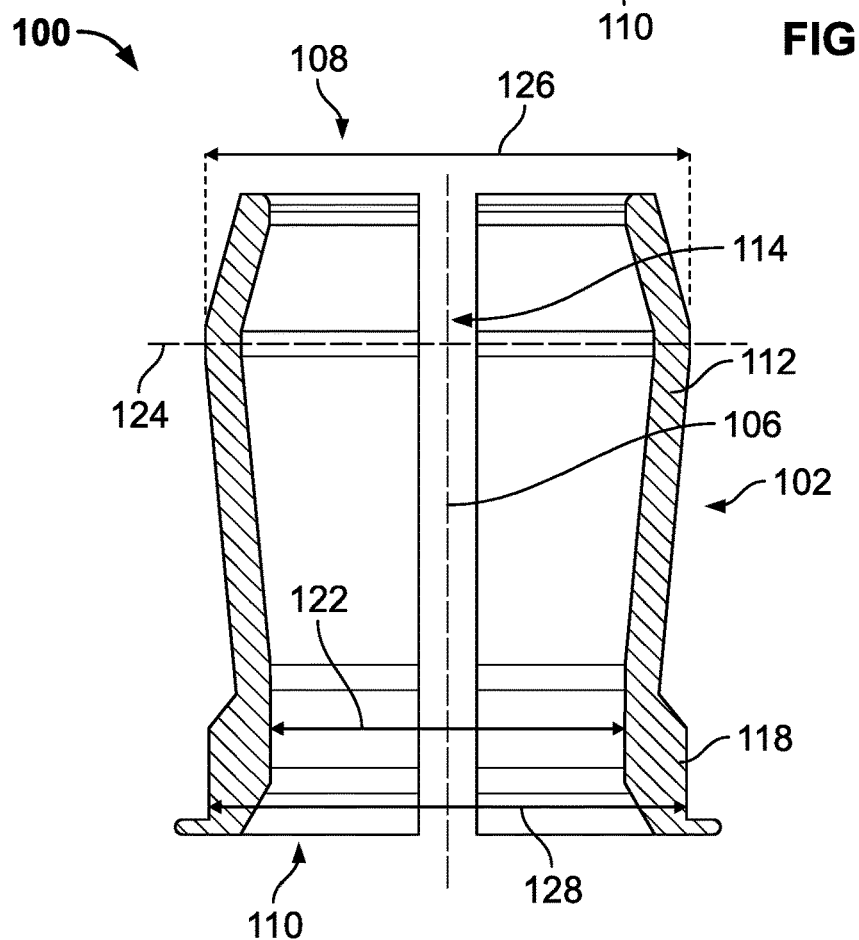
FIG. 6 is a side cross-sectional view of the bearing of FIG. 1.
Figure 7:
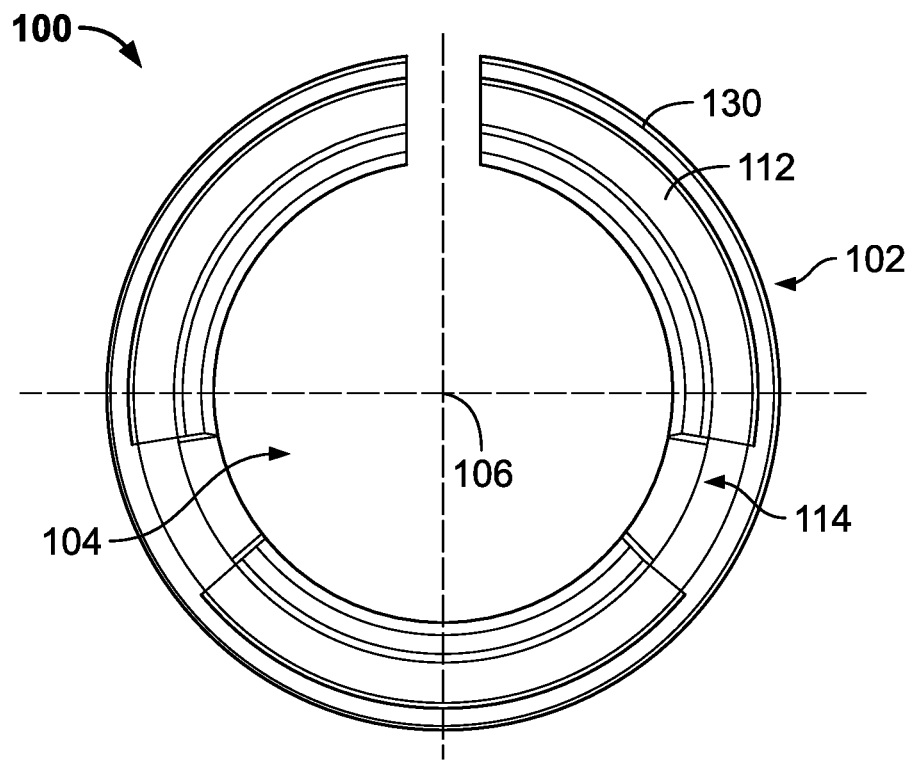
FIG. 7 is a top view of the bearing of FIG. 1.

As shown in FIGS. 5-6, the plurality of slots 114 extend through the first end 108 of the body 102 and separate the fingers 112 from one another. The slots 114 are formed into the body as rectangular cuts oriented parallel to the central axis 106 of the body 102. As shown in FIG. 7, the body 102 includes three slots and three fingers 112. In other embodiments, the shape, number, and/or arrangement of slots 114 may be different. For example, one or more slots may be angled with respect to the central axis 106. The size of the slots may also be different in various exemplary embodiments.

The opening 104 is sized to facilitate rotation of the bearing 100 with respect to the post 206. As shown in FIG. 4 (see also FIG. 6), an inner diameter 122 of the body 102 is approximately the same as an outer diameter of the post 206. In other embodiments, the inner diameter 122 of the body 102 may be smaller than an outer diameter of the post 206. Among other benefits, matching the diameter of the bearing 100 and post 206 minimizes damage associated with the bearing 100 moving relative to the post 206 (e.g., damage/wear due to friction between mating surfaces of the bearing 100 and post 206). According to an exemplary embodiment, the inner diameter 122 of the body 102 is approximately 0.765 in. In other embodiments with other faucet sizes, the inner diameter 122 of the body 102 may be different.

As shown in FIGS. 3-4, the bearing 100 is configured to engage with both the upper lip 208 and the lower ledge 210 of the post 206 to prevent axial movement (e.g., movement parallel to the central axis 106) of the bearing 100 and spout 202 relative to the faucet body 204. The fingers 112 are configured to engage with the upper lip 208 of the post 206. As shown in FIGS. 4 and 6, the fingers 112 are curved substantially radially outward and away from the post 206 at a central position 124 along the bearing 100 (e.g., a position between the first end 108 and the second end 110 of the body 102). The fingers 112 curve back toward the post 206 proximate to the first end 108, where they engage with a lower portion of the upper lip 208. At the same time, the second end 110 of the body 102 is configured to engage with the lower ledge 210 such that any force applied to the fingers 112 will place the post 206 in tension.

As shown in FIG. 5 (see also FIGS. 3-4), an uncompressed height 125 of the bearing 100 along the central axis 106 (e.g., a height of the body 102 without an externally applied force), from the first end 108 to the second end 110 of the body 102, is approximately the same as a height of the post 206 between the upper lip 208 and the lower ledge 210. Among other benefits, matching the heights of the mating surfaces of the bearing 100 and faucet body 204 prevents axial movement of the bearing 100 relative to the faucet body 204. In the exemplary embodiment of FIG. 5, the uncompressed height 125 of the bearing 100 is approximately 1.371 in. In various alternative embodiments, the uncompressed height 125 of the bearing 100 and/or post 206 may be different.

As shown in FIGS. 3-4, the bearing 100 is configured to engage with the spout 202 in at least two positions, at the central position 124 along the body 102 proximate to an outer most portion of the fingers 112, and at the plurality of ribs 118 proximate to the second end 110 of the body 102. Among other benefits, using multiple contact points between the bearing 100 and the spout 202 prevents axial movement of the spout 202 and prevents the spout 202 from wobbling (e.g., from tilting relative an axis of the faucet body 204).

The fingers 112 are configured to compress in a substantially axial direction. The fingers 112 are configured to extend parallel to the central axis 106 of the bearing 100 under radial compression (e.g., a force acting on the fingers 112 normal to the central axis 106 of the body 102). As shown in FIGS. 3-4, the fingers 112 are curved outward such that a radial gap is formed between the finger 112 and the post 206 at the central position 124 along the bearing 100. The fingers 112 are configured to engage with an inner surface of the spout 202 at the central position. The fingers 112 are configured to exert an outward pressure to the faucet spout 202 thus compressing the assembly, which couples the faucet spout 202 to the faucet body 204. Applying a radial compressive force on the fingers 112 toward the post 206 deforms the bearing 100 (e.g., acts to increase a height of the bearing 100 parallel to the central axis 106). The radial compressive force imposed by the spout 202 on the bearing 100 increases axial loading between the bearing 100 and the post 206, thereby placing the post 206 in tension. Among other benefits, loading the post 206 axially rather than radially prevents a substantial increase in the torque required to swivel the spout 202 relative to the faucet body 204.

As shown in FIG. 6, each one of the fingers 112 includes a curved portion at the central position 124 along the body 102. In the exemplary embodiment of FIG. 6, the curved portion of each one of the fingers 112 is an abrupt (e.g., sharp, etc.) transition between angled edges of the fingers 112. In various alternative embodiments, the shape of the fingers 112 may be different. For example, the curved portion of each finger 112 may extend along a radius. Among other benefits, the curved portion of each finger 112 provides a gradual lead-in to simplify assembly of the spout 202 onto the faucet body 204 (see also FIG. 4).

The compressible fingers 112 allow the bearing 100 to accommodate a larger tolerance range for both the spout 202 and the faucet body 204. An outer diameter 126 of the fingers 112, at the central position 124 along the body 102, is sized to maximize a holding force between the spout 202 and the bearing 100, while also minimizing a force required to assemble the spout 202 onto the bearing 100. According to an exemplary embodiment, the outer diameter 126 of the fingers 112 (e.g., an uncompressed outer diameter of the fingers 112) is slightly greater than an inner diameter of the spout 202. In the embodiment of FIG. 6, the outer diameter 126 of the fingers 112 is approximately 1.046 in. In alternative embodiments, a larger or smaller diameter may be used.

Referring now to FIGS. 4-6, the bearing 100 includes a plurality of ribs 118 disposed at the second end 110 of the bearing 100. As shown in FIGS. 4-6, the ribs 118 are radial protrusions configured to engage with the spout 202 proximate to a lower edge of the spout 202. In combination with the fingers 112, the ribs 118 can, advantageously, minimize spout 202 wobble by stabilizing the spout 202 at multiple points along the length of the spout bore. According to an exemplary embodiment, the ribs 118 include crush ribs configured to deform and bend to accommodate the spout 202.

As shown in FIG. 5, the ribs 118 extend from the second end 110 of the body 102, parallel to the central axis 106 of the body 102, toward the first end 108 of the body 102. The ribs 118 extend axially between the second end 110 and a trailing edge of the slots 114. In order to ensure that the ribs 118 engage with the spout 202, an outer diameter 128 of the ribs 118 is greater than in inner diameter of the spout 202 bore. As shown in FIG. 6, the outer diameter 128 of the ribs 118 is approximately 1.021 in. In alternative embodiments, the outer diameter 128 of the ribs 118 may be different. It will be appreciated that the number, size, and arrangement of ribs 118 may be modified without departing from the inventive principles disclosed herein.

Figure 8:
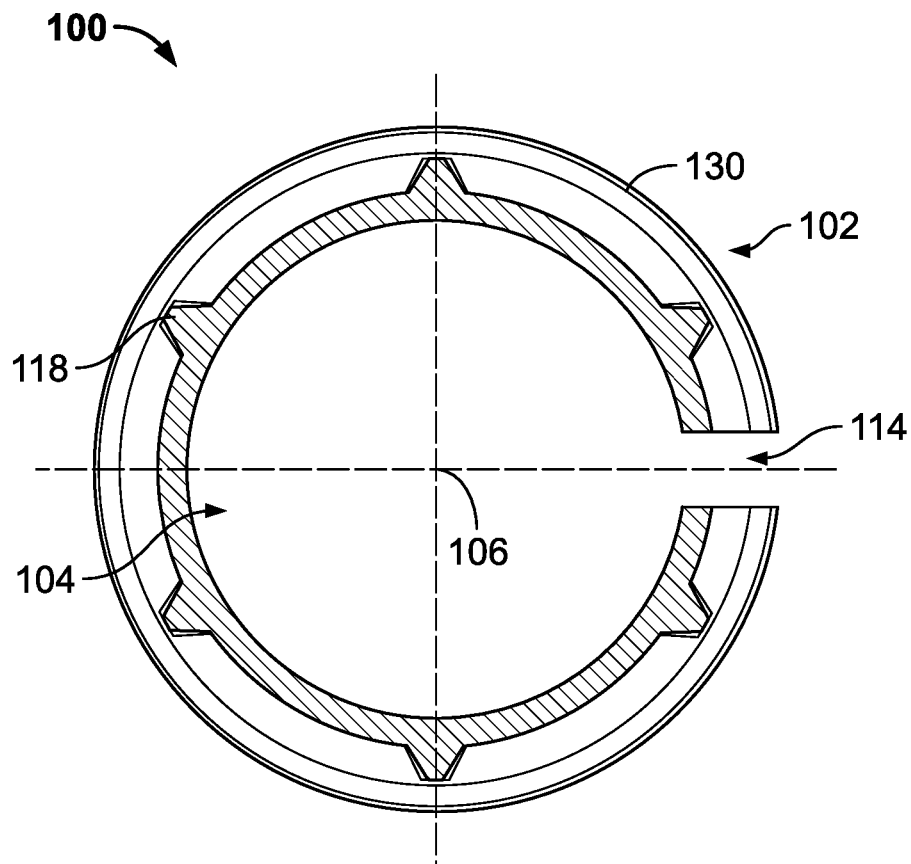
FIG. 8 is a top cross-sectional view of the bearing of FIG. 1.

Referring now to FIGS. 3-8, the bearing 100 incudes a flange 130 disposed at the second end 110 of the body 102. As shown in FIGS. 7-8, the flange 130 extends radially outward from the body 102 beyond the fingers 112 and the ribs 118. Among other benefits, the flange 130 supports the ribs 118 at the second end 110 of the body 102. As shown in FIGS. 3-4, the flange 130 is configured to engage with both a lower axial end 212 of the faucet spout 202 and an axial end surface of the faucet body 204 (e.g., lower ledge 210 as shown in FIG. 4). The flange 130 is "sandwiched" or otherwise disposed between the spout 202 and the faucet body 204, which, advantageously, reduces rotational torque and prevents wear associated with rotational movement of the spout 202 with respect to the faucet body 204.

Figure 9:
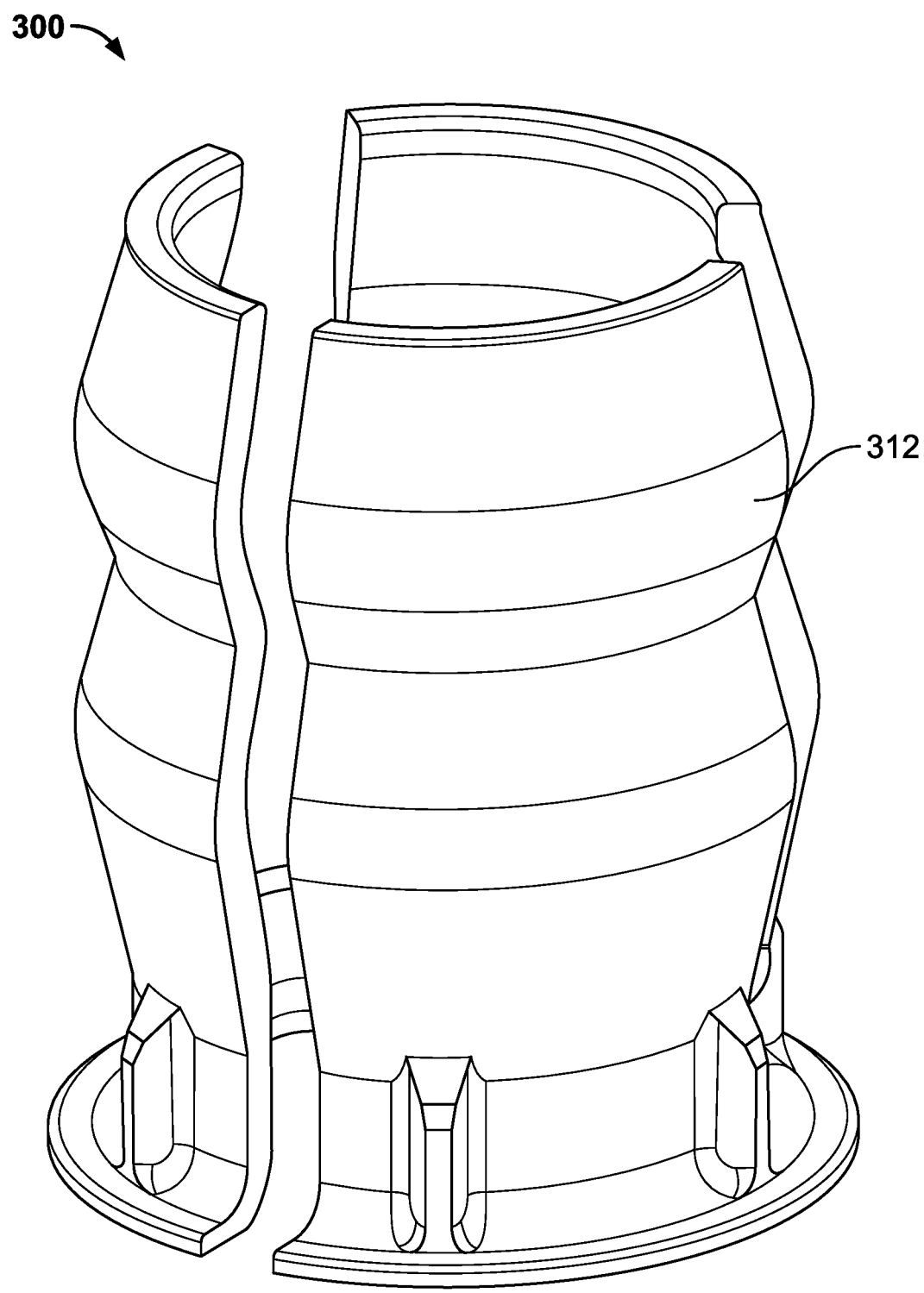
FIG. 9 is a perspective view of a bearing, according to another exemplary embodiment.

The size, shape, and arrangement of features described with reference to the bearing 100 of FIGS. 1-8 should not be considered limiting. Many alternatives are possible without departing from the inventive concepts disclosed herein. For example, FIG. 9 shows a bearing 300 including fingers 312 with multiple curved portions. Similar to the bearing 100 of FIGS. 1-8, the fingers 312 of the bearing 300 (FIG. 9) are configured to extend parallel to a central axis of the bearing 300 under compression from the faucet spout 202. Among other benefits, using multiple curved portions provides improves support of the spout 202 relative to the faucet body 204.

The bearing, of which various exemplary embodiments are disclosed herein, provides several advantages over existing faucet bearings. The bearing includes a plurality of fingers configured to engage with a faucet spout between the first and second ends of the bearing. The fingers are configured to deform under compression from the faucet spout, which, advantageously, reduces frictional wear on the mating surfaces of the faucet body. Among other benefits, the fingers allow a greater tolerance range to be used for the spout and the faucet body, which improves part yield and reduces manufacturing costs.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the application as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present application. For example, any element disclosed in one embodiment may be incorporated or utilized with any other embodiment disclosed herein.

What is claimed is:

1. A bearing configured to couple a spout to a faucet body comprising an annular flange and a plurality of fingers each including an outwardly bowed portion, wherein an outermost diameter of at least one of the plurality of fingers is configured to contact an inner surface of the spout,
wherein the bowed portion of the fingers are bowed radially outward and away from a central axis between opposing ends of the fingers, and
wherein the bowed portion of the fingers extend outwardly at an intermediate position along the fingers so that an inner diameter of the fingers at the intermediate position is greater than an inner diameter of the fingers at opposing ends of the fingers.

2. The bearing of claim 1, further comprising a plurality of ribs disposed proximate to an end of the bearing.

3. The bearing of claim 1, wherein the fingers are bowed radially away from a central axis in multiple positions between the opposing ends of the fingers.

4. The bearing of claim 1, wherein each one of the fingers is formed in a V-shape.

5. A bearing configured for coupling a first faucet part to a second faucet part, comprising:
a bearing body comprising a plurality of fingers, wherein adjacent fingers are separated from one another by a slot extending through a first end of the bearing body, wherein a first portion of the fingers extends an angle away from the central axis, and a second portion of the fingers is angled with respect to the first portion back toward the central axis such that an outermost diameter at an intermediate portion between the first portion and the second portion of at least one of the plurality of fingers is configured to contact an inner surface of the first faucet part,
wherein an inner diameter of the fingers at the intermediate position is greater than an inner diameter of the fingers at the first end.

6. The bearing of claim 5, wherein an inner diameter of the second portion at the first end of the bearing body is less than an inner diameter of the second portion away from the first end.

7. The bearing of claim 5, wherein the fingers are bowed radially outward and away from the central axis between the first end and a second end of the bearing body.

8. The bearing of claim 5, further comprising a plurality of ribs disposed proximate a second end of the bearing body.

9. The bearing of claim 8, wherein the ribs extend from the second end of the bearing body toward the first end, and wherein the ribs are oriented parallel to the central axis of the bearing body.

10. The bearing of claim 9, wherein a height of the ribs along the central axis of the bearing body is less than a height of the slots.

11. The bearing of claim 5, wherein the bearing body further comprises a flange disposed at a second end of the bearing body and extending radially outward from the bearing body.

12. The bearing of claim 5, wherein the fingers are bowed radially away from the central axis in multiple positions between the first end and a second end of the bearing body.

13. The bearing of claim 5, wherein each one of the fingers is formed in a V-shape.

14. A faucet assembly, comprising:
a faucet body comprising a ledge, a post extending away from the ledge, and a lip proximate to an upper end of the post;
a faucet spout; and
a bearing including an annular flange and a plurality of fingers bowing outwardly from the annular flange, the bearing disposed between the faucet spout and the faucet body, wherein:
a first end of the bearing is engaged with the lip;
a second end of the bearing is engaged with the ledge; and
the fingers are configured to compress axially by pressing against the upper lip and the ledge in response to a radial force applied to the bearing by the faucet spout when the faucet spout is coupled with the faucet body.

15. The faucet assembly of claim 14, wherein the plurality of fingers are engaged with the lip of the post at an end of the fingers.

16. The faucet assembly of claim 15, wherein the fingers are bowed radially away from the post at multiple positions between the first end and the second end.

17. The faucet assembly of claim 14, wherein the bearing further comprises a plurality of ribs disposed at the second end, wherein the ribs are engaged with the faucet spout.

18. The faucet assembly of claim 14, wherein the annular flange is engaged with and disposed between an axial end surface of the faucet spout and the ledge.

* * * * *